3,170,497
SOLID TOE ROUTER SAW CHAIN
Jack W. Ehlen, Torrance, and George A. Frech, Los Angeles, Calif., assignors to McCulloch Corporation, Los Angeles, Calif., a corporation of Wisconsin
Filed Apr. 25, 1962, Ser. No. 191,395
5 Claims. (Cl. 143—135)

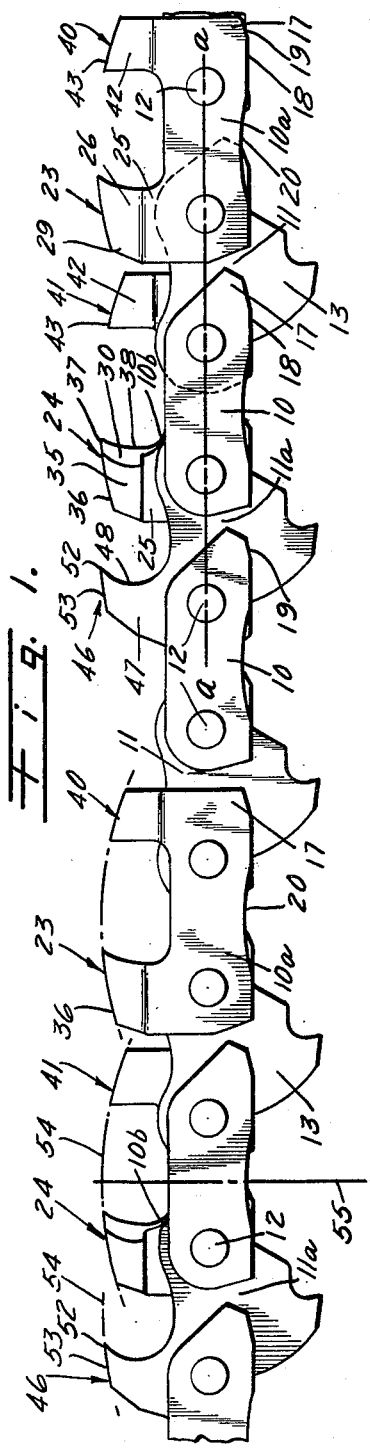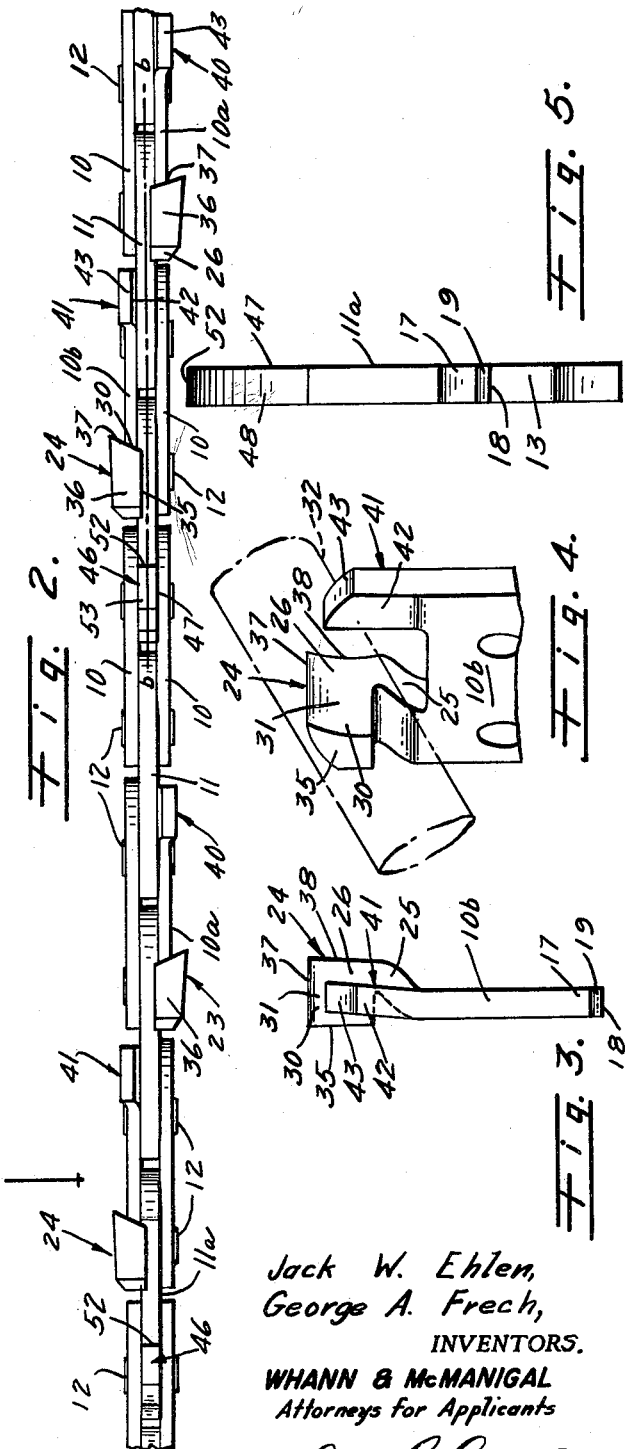

This invention relates to saw chains that can be sharpened during cutting operations and, more particularly, to a saw chain having side cutters in the form of routers having solid toes or blocks.

It is an object of the invention to provide an improved saw chain.

It is another object of the invention to provide a saw chain that cuts chips substantially as long as the length of the cutting sequence and substantially as wide as the kerf, indicating efficient cutting.

It is still another object of the invention to provide a saw chain having a short sequence of three cutters so as to provide stable and smooth cutting. This makes possible easier handling of the chain saw and lengthens the saw bar life. Placing the cutters closer together on the chain to make a short sequence also prevents binding during notching and undercutting.

It is a further object of the invention to provide a router type cutter having a solid toe that feeds into wood better for various grain conditions than was heretofore possible.

It is a still further object of the invention to provide a solid toe router cutter having its front face concaved with a round file. It has been found that the round filing of the front face aids the router side cutters to feed themselves into the sides of the kerfs in the wood to an extent that was heretofore unknown.

It is another object of the invention to provide a saw chain with ease of cutting so that the saw chain requires very little pressure to produce the proper cutting and which does not lug the saw down in the manner experienced with prior art chains.

It is still another object of the present invention to provide router type cutters which when sharpened during cutting operation automatically have their top clearance angle maintained rearwardly of their top or transverse cutting edges.

It is a further object of the invention to provide solid toe router cutters which maintain substantially the same kerf width after being sharpened as before, as the result of using a round file to form the angle between the outer top surface of the cutter and the front face. By using a round file to form the top angle or face angle of the cutter, sloping the file downwardly from the horizontal and guiding it rearwardly from the forward vertical cutting edge of the cutter so to be forming a compound angle, the angle of the face is increased as it is filed or ground downwardly from the top of the cutter. Thus, when the cutter is new it may have a 20° angle formed with the top surface and the front face surface and then as the top of the cutter is ground away to sharpen the top or transverse cutting edge, the cutting width of the cutters is reduced. However, as a result of having a compound angle across the front face, when the top of the cutter is sharpened, the angle between the top of the cutter and the face is increased. This causes the side cutters to compensate for their narrower, sharpened width and causes them to feed into the side of the kerf. That is, they move out and take a bigger bite in the kerf as though they were wider. Thus, the filing of the compound angle across the front face of the cutter permits the saw chain to cut substantially the same width of kerf as before the cutters are worn by the sharpening.

It is a still further object of the invention to provide a saw chain having cutters which may be sharpened during cutting operation and which have a large area across their top to prevent the sharpener from dubbing off the leading edge of the cutters.

In comparing the present invention with a well-known, commercially successful hooded chisel-type saw chain in making equal cuts at optimum engine speeds using approximately six horse power, it has been found that the present invention makes the various typical saw chain cuts in substantially less time than the prior art chain makes them.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes only:

FIG. 1 is a side elevational view illustrating two sequences of cutters of a saw chain according to the invention;

FIG. 2 is a top plan view of the saw chain shown in FIG. 1;

FIG. 3 is an end view of a side link having a side cutter and depth gauge thereon;

FIG. 4 is a fragmentary perspective view of the side link and cutter shown in FIG. 3, illustrating the direction of filing to form the front face of the side cutter; and FIG. 5 is an end view of a center link having a center cutter thereon.

Referring again to the drawings, there is illustrated a portion of an endless saw chain including side links 10 and center links 11 connected consecutively by transversely directed pintles 12 having hinge axes lying in the horizontal center plane a—a of the chain. Extending downwardly or vertically inwardly, with respect to an endless chain, on the center links are sprocket engaging projections or tangs 13 adapted to travel in a groove formed laterally inwardly of the longitudinal edges on a saw bar and being further adapted to be engaged in pockets formed between the teeth of a driving sprocket between two discs sandwiching the sprocket, the teeth of which drive the projections so as to operate the chain.

On the leading ends of the center and side links are extensions 17, longitudinally forwardly of the forward pintle, having a rearward horizontal surface 18 and an upwardly sloping or vertically inwardly facing outwardly relieved forward portion 19. Each extension 17 is limited longitudinally to provide clearance with the link immediately forwardly thereof but contacts the outer circumferential surface of a sprocket tooth, in the case of a center link, and the outer circumferential surfaces of discs sandwiching the sprocket, in the case of the side links, as the chain moves into engagement with the driving sprocket. This arrangement limits the vertical movement of the side links and center links on the sprocket so as to provide a smooth and constant positioning of the chain thereon and to properly position the cutting elements for sharpening on a whetting member in the chain saw engine.

To further aid in properly positioning the chain on the sprocket, each side link 10 has a longitudinally arced, downwardly or vertically inwardly facing, generally horizontal surface 20. The surfaces 20 have the same radii as the unshown discs which sandwich the driving sprocket, and therefore, ride on the discs to position the side links concentrically therewith.

At the right in FIGS. 1 and 2 is a sequence of three cutters extending vertically outwardly in the direction of the vertical longitudinal center plane b—b of the chain. On the left is a second sequence of three identical cutters so as to form a full complement chain, the sequences being spaced by a pair of oppositely disposed side links 10 and a single center link 11. The chain may also be formed with additional spacing side and center links between cutting elements and the sequences, depending upon the chip clearance desired.

On a first selected side link 10a is a right-hand solid toe router cutter 23 and on a second selected side link 10b, on the opposite side of the chain, is a left-hand side cutter 24 in allochiral relationship with the cutter 23. Each of the cutters is formed on an intermediate portion 25 extending vertically upwardly and laterally outwardly from the link. Extending vertically outwardly from the intermediate portion in the general direction of the plane of the link and laterally outwardly therefrom is a shank portion 26 extending longitudinally to form an outside face 29 which trails laterally inwardly forming a relieved portion for clearance. The face 29 is also tapered to extend laterally inwardly from its top or outer generally horizontal edge.

Extending transversely inwardly from the shank 26 is a transverse toe portion 30, spaced vertically outwardly from the link in the general direction thereof, and being integral and substantially vertically coextensive with the shank. The shank and toe form an elongated block having a continuous front, generally vertically and transversely directed, compound-curved face 31. The compound-curved face is formed, as indicated in FIG. 4, by directing a circular file 32 transversely inwardly and downwardly inwardly on it. An inside face 35 of the block is generally parallel to the central vertical plane b—b of the chain and is spaced laterally outwardly thereof so the cutting paths formed by side cutters on opposite sides of the chain do not overlap. Outer surface 36 of the cutter is arced and extends rearwardly from the front face 31, trailing vertically inwardly toward the link.

The upper face 36 and the front face 31, formed of the shank and toe portions, join to form a straight line transverse cutting edge 37 which extends inwardly rearwardly from its laterally outside end. Joining the transverse cutting edge 37, at slightly less than 90° thereto, is a generally vertically directed straight line side cutting edge 38 formed along the common edge of the front face of the shank and its outside face 29. The cutting edges 37 and 38 form one continuous cutting edge to simultaneously take cuts along the bottom and side of the kerf.

On the selected side links, spaced forwardly of the right and left-hand side cutters 23 and 24, are right and left-hand depth gauges 40 and 41, respectively. Each depth gauge has a shank portion 42 extending vertically outward from its link and laterally outwardly from the plane thereof to be in substantial longitudinal alignment with its cutter. The depth gauges extend outwardly from the horizontal plane a—a of the chain a short distance less than the transverse cutting edges of the cutters, according to the depth of cut desired. The outer surface 43 of the depth gauge is arced and extends rearwardly, vertically outwardly from its forward end.

In each sequence of cutters, immediately following the second side cutter on a selected center link 11a is a center cutter 46. Each center cutter has a shank portion 47 extending vertically outwardly from its center link, being of the same transverse thickness thereof. A forward surface 48 of the shank is filed or ground to be concave and terminates in a forwardly extending transverse cutting edge 52. The longitudinal plane b—b of the chain extends through the cutting edge 52 and is substantially perpendicular thereto. From each cutting edge 52 extends an arced outer or top surface 53 which trails vertically inwardly.

The curved outer surfaces 36, 43 and 53 of the side cutters, depth gauges and center cutters, respectively, as shown in FIG. 1, lie on equivalent arcs 54 of equal radii, the centers of which are located on a line, such as 55, perpendicular to the horizontal center plane of the saw chain and extending midway between the axes of each pair of pintles 12 so that the distance of the arcs of the cutters and of the depth gauges from the horizontal plane of the chain is determined by their horizontal distances from the line 55 or by horizontal distances measured from the axes of the pintles. For example, the cutting edges 37 and 52 are of the same distance from the horizontal plane of the chain and, therefore, are the same horizontal distance from the axes of the respective pintles of the side links 10a and 10b and of the center links 11a respectively. The same relationship exists with the respective depth gauges.

The particular arrangement of the cutters and depth gauges, all being on arcs 54 having equal radii, and which when rotated on the driving sprocket, having the same center as the arcs 54 and 20, makes it possible to sharpen the chain with a hone or grinding wheel on the chain saw engine in that each outer surface of each cutter and each depth gauge contacts the sharpening surface at the same distance from the center of the arc 54. This provides a much better way of asharpening than the use of an individual file, both as to speed and as to accuracy. Further, the sharpening operation is made more accurate by the extension 17 on the leading longitudinal ends of the links and by the arced inwardly facing surfaces 20 on the side links which ride on the discs which sandwich the sprocket. In addition, limiting of the vertical movement of the chain on the sprocket by the extensions 17 reduces the chain wear considerably.

This type of sharpening, which may be accomplished in the cutting operations, automatically maintains the top clearance angle provided by the arced surfaces on top of the cutters. That is, even though a new cutting edge is formed in the grinding on the saw chain, the operator need not be concerned with the maintenance of a proper clearance angle rearwardly of the transverse cuttings edges.

As most of the work is performed by the top cutting edges 37 of the side cutters, they need sharpening more often than do the side cutter edges 38 which may be sharpened with a circular file, as indicated above. Also, as previously indicated, the use of a round file to form a compound angle across the front face 31 of the side cutters causes the angle formed between the top of the cutter and the face to be increased as the top of the cutter is sharpened. This permits the chain to compensate for its narrower, sharpened width and causes it to feed better into the side of the kerf, taking bigger bites than it would if it were not for the formation of the compound angle across the front face. Thus, the cutters cut substantially the same width kerf before and after sharpening.

Another advantage of having the block-shaped or solid toe cutter is that during the sharpening operation on the chain saw, the large area across the front face of the cutters prevents the sharpener from dubbing off the leading edge.

In the cutting operation, which is very stable because of the short sequence of the cutters, the two side cutters cut chips that are generally longer than those cut by prior art saw chains. The chips cut by the present saw chain are usually about as long as the sequence of cutters in cross grain cutting. It thus appears that the center cutter releases the chip cut by the side cutters. In ripping operations, substantially longer chips are cut and the times for specific operations have been found to be less than half of that required for the better prior art saw chains. In both ripping and cross grain cutting, the chips are formed substantially as wide as the kerfs.

Another important advantage of the invention relates to boring operations in which it is very important to have a constant and accurate relationship between the links of the teeth and the depth gauges. This is achieved with the present chain by having the teeth and depth gauges set on the equivalent arcs and maintaining them in their relative positions after they have been sharpened. Complementary to this, the saw bar nose wheel or sprocket, or the bar nose if a wheel is not used, have a radius larger than the radius of the driving sprocket so as to provide a clearance angle at the top of the teeth so that the effective depth gauge setting is considerably less in boring than when the same saw is used for cutting longitudinally along the bar. This prevents the saw chain from jumping in boring operations and it can be handled by a novice; whereas previously the boring operation in the woods has been an extremely hazardous one and many people have been cut by the saw chain because the nose end jumped out of the bore.

A chain can be made according to the invention by having the tangs or projections 13 on the side links of a chain which are adapted to travel on a straddle-type bar rather than a groove bar. For such an embodiment, two sprockets are used having a disc of the same diameter sandwiched between the sprockets and integral therewith.

It is clear that the present cutters and links may be used in various other arrangements without departing from the inventive principles disclosed herein.

We claim:

1. For a saw chain having side links and center links alternately connected by hinge means disposed on transverse hinge axes, a side cutter on a side link plate, said side cutter comprising:
   (a) an intermediate portion connected to said side link plate, said portion being defined by an inclined inside face extending from said side link plate and an outside face extending laterally outwardly from said side link plate;
   (b) a longitudinally directed block extending from said intermediate portion vertically outwardly from the respective link plate substantially in the direction of the plane thereof;
   (c) a continuous, generally vertically transverse front face on said block extending over and spaced from the respective link plate;
   (d) an outside face on said block laterally outwardly of the respective link plate extending substantially in the direction thereof, and an inside face on said block lateraly inwardly of the respective link plate extending substantially in the direction thereof;
   (e) said outside face extending longitudinally rearwardly from said front face and trailing laterally inwardly;
   (f) a top generally horizontal face on said block extending longitudinally rearwardly from said front face and trailing vertically inwardly, said top face and outside face adjoining;
   (g) a transverse cutting edge being formed with the top face and front face;
   (h) a generally vertical cutting edge being formed with the outside face and the front face and extending substantially in the direction of the respective plate, and an inside vertical edge being formed with said inside face and said front face, said inside vertical edge being opposite said vertical cutting edge and substantially coextensive therewith,
   (i) said cutting edges adjoining to form a continuous cutting edge,
   (j) said top face lying on an arc whose center is on a line centrally positioned between said hinge axes of said side link and which is perpendicular to a plane in which the hinge axes of said side link lie;
   (k) and a bottom continuously horizontal face subjacent said top face extending from and laterally above said inclined inside face of said intermediate portion and terminating inwardly adjoining said inside face on said block,
   (l) said front face of said block being defined by said horizontal top and bottom faces and said coextensive, vertical outside and inside edges of said outside and inside faces respectively.

2. In a saw chain, a side cutter according to claim 1 wherein said front face of said block has a compound angle adapted to be formed by moving a round file thereacross, sloping the file downwardly from the horizontal and guiding it rearwardly from said vertical cutting edge so that a laterally inwardly portion of said front face extending laterally inwardly over said plate has its lower end rearwardly of its upper end formed at the laterally inner end of said transverse cutting edge.

3. In a saw chain, side links and center links alternately connected by hinge means disposed on transverse hinge axes, a side cutter on a side link plate, said side cutter comprising:
   (a) an intermediate portion connected to said side link plate, said portion being defined by an inclined inside face extending laterally over said side link plate and an outside face extending laterally outwardly from said side link plate;
   (b) a longitudinally directed block extending from said intermediate portion vertically outwardly from the respective link plate substantially in the direction of the plane thereof;
   (c) a continuous, generally vertically transverse front face on said block extending over and spaced from the respective link plate;
   (d) an outside face on said block laterally outwardly of the respective link plate extending substantially in the direction thereof, and an inside face on said block laterally inwardly of the respective link plate extending substantially in the direction thereof;
   (e) said outside face extending longitudinally rearwardly from said front face and trailing laterally inwardly;
   (f) a top generally horizontal face on said block extending longitudinally rearwardly from said front face and trailing vertically inwardly, said top face and outside face adjoining;
   (g) a transverse cutting edge being formed with the top face and front face;
   (h) and a generally vertical cutting edge being formed with the outside face and the front face and extending substantially in the direction of the respective plate, and a vertical edge being formed with said inside face and said front face, said inside vertical edge opposite said vertical cutting edge and substantially coextensive therewith;
   (i) said cutting edges adjoining at a substantial right angle to form a continuous cutting edge;
   (j) said top face lying on an arc whose center is on a line centrally positioned between said hinge axes of said side link and which is perpendicular to a plane in which the hinge axes of said side link lie;
   (k) a bottom continuously horizontal face subjacent said top face extending from and laterally inwardly above said inclined inside face of said intermediate portion and terminating inwardly adjoining said inside face on said block;
   (l) said front face of said block being defined by said horizontal top and bottom faces and said coextensive, vertical outside and inside edges of said outside and inside faces respectively.

4. In a saw chain according to claim 3 including a depth gauge spaced forwardly from said cutter on said side link and extending outwardly therefrom in the general direction thereof, said top face of said cutter and a corresponding outer top face on said depth gauge lying on an arc whose center is on a line centrally positioned between said hinge axes of said side link and which is perpendicular to a plane in which the hinge axes of said side link lie.

5. In a saw chain:
   (a) side links and center links alternately connected by hinge means disposed on transverse hinge axes;
   (b) sprocket engaging means on selected links;

(c) side cutters allochirally and alternately arranged on opposite sides of the chain on selected side link plates;

(d) each side cutter having an intermediate portion connected to said side link plate, said portion being defined by an inclined inside face extending laterally over said side link plate and an outside face extending laterally outwardly from its side link plate;

(e) a longitudinally directed block extending from said intermediate portion vertically outwardly from the respective link plate substantially in the direction of the plane thereof;

(f) a continuous, generally vertical transverse front face on said block extending over and spaced from the respective link plate;

(g) an outside face on said block laterally outwardly of the respective link plate extending substantially in the direction thereof and an inside face on said block laterally inwardly of the respective link plate extending substantially in the direction thereof;

(h) said outside face extending longitudinally rearwardly from said front face and trailing laterally inwardly;

(i) a top generally horizontal face on said block extending longitudinally rearwardly from said front face and trailing vertically inwardly, said top face and outside face adjoining;

(j) a transverse cutting edge being formed with the top face and front face, a generally vertical cutting edge being formed with the outside face and the front face, and a vertical edge being formed with said inside face and said front face, said inside vertical edge opposite said vertical cutting edge and substantially coextensive therewith;

(k) said cutting edges adjoining to form a continuous cutting edge, (l) a bottom continuously horizontal face subjacent said top face extending from and laterally inwardly above said inclined inside face of said intermediate portion and terminating inwardly adjoining said inside face on said block, (m) said front face of said block being defined by said horizontal top and bottom faces and said coextensive, vertical outside and inside edges of said outside and inside faces respectively, (n) said side cutters terminating laterally inwardly outwardly of the central longitudinal plane of the chain extending in the direction of the plane of the links;

(o) depth gauges spaced forwardly of said side cutters on said selected side links and extending outwardly therefrom in said general direction;

(p) and center cutters on selected center links;

(q) each center cutter extending outwardly from its selected center link in the general direction of the plane thereof and having a transverse cutting edge, (r) each center cutter following a group of alternately arranged side cutters;

(s) the cutting edges of the center cutters overlapping the cutting path of the side cutters, (t) said side cutters, center cutters and depth gauges having top faces lying on arcs of equal radii, the center of the arcs being correspondingly centrally positioned relative to the hinge axes of the selected links.

References Cited by the Examiner

UNITED STATES PATENTS

| | | |
|---|---|---|
| 2,774,396 | 12/56 | Gommel. |
| 2,854,041 | 9/58 | Siverson. |
| 3,036,606 | 5/62 | Richardson. |
| 3,040,602 | 6/62 | Carlton. |
| 3,066,711 | 12/62 | Winnlert et al. _____ 143—135 |

FOREIGN PATENTS

| | | |
|---|---|---|
| 870,181 | 3/53 | Germany. |
| 824,602 | 12/59 | Great Britain. |

WILLIAM W. DYER, Jr., *Primary Examiner.*

DONALD R. SCHRAN, *Examiner.*